US007948099B2

(12) United States Patent
Mottier

(10) Patent No.: US 7,948,099 B2
(45) Date of Patent: May 24, 2011

(54) METHOD OF CONTROLLING POWER SUPPLY TO AN ELECTRIC STARTER

(75) Inventor: Michel-Lou Mottier, Saint Bonnet de Mure (FR)

(73) Assignee: Renault Trucks, Saint Priest (FR)

(*) Notice: Subject to any disclaimer, the term of this patent is extended or adjusted under 35 U.S.C. 154(b) by 510 days.

(21) Appl. No.: 11/915,132

(22) PCT Filed: May 26, 2005

(86) PCT No.: PCT/FR2005/050380

§ 371 (c)(1),
(2), (4) Date: Feb. 11, 2008

(87) PCT Pub. No.: WO2006/125872

PCT Pub. Date: Nov. 30, 2006

(65) Prior Publication Data

US 2008/0258472 A1 Oct. 23, 2008

(51) Int. Cl.

| | |
|---|---|
| ***F02N 11/00*** | (2006.01) |
| ***H02P 9/04*** | (2006.01) |
| *F02N 11/04* | (2006.01) |
| *F02N 11/08* | (2006.01) |
| *F02N 99/00* | (2006.01) |

(52) U.S. Cl. .................. 290/38 R; 290/38 D; 123/179.3

(58) Field of Classification Search ................ 290/38 D, 290/38 R; 123/179.3

See application file for complete search history.

(56) References Cited

U.S. PATENT DOCUMENTS

| | | | | |
|---|---|---|---|---|
| 3,696,333 | A * | 10/1972 | Mott | 290/38 D |
| 4,296,334 | A | 10/1981 | Wong et al. | 290/37 R |
| 4,392,059 | A | 7/1983 | Nespor et al. | 290/38 D |
| 4,490,620 | A * | 12/1984 | Hansen | 290/38 R |
| 4,577,599 | A * | 3/1986 | Chmielewski | 123/179.2 |
| 4,606,307 | A * | 8/1986 | Cook | 123/179.2 |
| 4,653,442 | A * | 3/1987 | Swenson | 123/179.3 |
| 5,042,439 | A * | 8/1991 | Tholl et al. | 123/179.2 |
| 5,146,095 | A * | 9/1992 | Tsuchiya et al. | 290/38 R |
| 5,155,373 | A * | 10/1992 | Tsuchiya et al. | 290/38 R |
| 6,050,233 | A | 4/2000 | Vilou et al. | 123/179.3 |
| 6,531,787 | B2 * | 3/2003 | Koelle et al. | 290/31 |
| 6,668,781 | B1 * | 12/2003 | Seils et al. | 123/179.3 |
| 7,156,063 | B2 * | 1/2007 | Denz | 123/179.3 |
| 7,804,180 | B2 * | 9/2010 | Labbe et al. | 290/38 R |
| 7,806,095 | B2 * | 10/2010 | Cook et al. | 123/179.3 |
| 2004/0036296 | A1 | 2/2004 | Blackburn et al. | 290/48 |
| 2005/0139181 | A1 * | 6/2005 | Denz | 123/179.3 |
| 2005/0247280 | A1 * | 11/2005 | Asada et al. | 123/179.3 |
| 2006/0098390 | A1 * | 5/2006 | Ashtiani et al. | 361/502 |
| 2009/0050092 | A1 * | 2/2009 | Handa et al. | 123/179.3 |
| 2010/0213713 | A1 * | 8/2010 | Biessenberger et al. | 290/48 |

FOREIGN PATENT DOCUMENTS

| | | | |
|---|---|---|---|
| FR | 2839344 | A | 11/2003 |
| WO | 03/078194 | A | 9/2003 |

* cited by examiner

*Primary Examiner* — Pedro J. Cuevas

(74) *Attorney, Agent, or Firm* — Novak Druce + Quigg LLP

(57) ABSTRACT

The invention relates to a method of controlling the power supply to an electric starter that drives heat engine of a vehicle, in which the starter power supply is stopped after each supply phase for a first pre-determined period $T_{OFF}$. According to the invention, the starter power supply is inhibited for a second pre-determined period $T_{REP}$ which is longer than the first period $T_{OFF}$, when the number $N_{ON}$ of consecutive starter supply phase $ON_1$, $ON_2$, $ON_3$, $ON_4$ exceeds a pre-determined value $N_{MAX}$ without the heat engine reaching an autorotation state.

5 Claims, 2 Drawing Sheets

METHOD OF CONTROLLING POWER SUPPLY TO AN ELECTRIC STARTER

TECHNICAL FIELD

The invention relates to the electric starters used for starting internal combustion engines, notably on vehicles. More particularly the invention relates to a method of controlling the power supply of such a starter, which is intended to provide protection against the phenomena of overheating that may occur in certain circumstances.

PRIOR ART

Generally, an electric starter is used to drive an internal combustion engine in its start-up phase, until the latter reaches a self-maintained state. More precisely, and especially in diesel engines, the objective of the starter is to drive the engine until a so-called "first engine explosion" state, then to accompany its drive until it reaches an "autorotation" state. Beyond this autorotation state, it is detrimental to the integrity of the starter for it to continue its rotation at the speed of the engine. It is therefore necessary to disengage the starter from the engine beyond a certain speed state, to prevent damage due to overspeed phenomena.

Various devices and methods have been disclosed in documents U.S. Pat. No. 4,994,683, U.S. Pat. No. 6,202,615 and EP 0 812 986, with the object of preventing any malfunctioning of the starter which would result from driving by the engine when the latter has reached its autorotation state.

Another known cause of damage to electric starters relates to overheating phenomena. Said overheating phenomena can have different origins, including excessive stresses.

What happens in the event of a problem in the injection circuit is that the fuel does not arrive in the engine combustion chamber, which therefore cannot reach its first explosion state, in spite of a prolonged power supply from the starter and therefore a driving of the engine. But these injection problems may occur mainly during an attempt at starting, when the injection circuit is not force fed.

One known solution for preventing an excessive rise in temperature of the starter consists in equipping it with a thermal trip switch opening its power supply circuit when the temperature exceeds a predetermined threshold. Obviously the addition of such a protection component greatly increases the overall cost of the starter.

It is also known that the starting phases can be longer or shorter according to the ambient temperature, and systems including temperature sensors for taking this into account have already been suggested. These sensors are arranged either inside the starter, or in the cooling circuit of the internal combustion engine. Such solutions are disclosed in documents JP 08-093 609, JP 09-296 772 and JP 11-148 449.

More precisely, the devices disclosed in these documents vary the maximum duration of the power supply phases of the starter according to the temperatures measured and force the starter not to be stressed for a specified time after the power supply phase. These various devices also have many drawbacks. In fact, in the case where the temperature sensor is fitted inside the starter, the cost of the latter is increased. When the temperature is sensed outside the starter, there is a risk of linking together several power supply phases causing a rapid increase in the internal temperature of the starter, without the ambient or the cooling circuit temperature varying. In other words, the risks of damage by overheating of the starter remain very great.

DESCRIPTION OF THE INVENTION

One of the objectives of the invention is to provide thermal protection of the starter that is efficient and which does not need the use of special components or sensors.

The invention therefore relates to a method of controlling the power supply of an electric starter driving the internal combustion engine of a vehicle. In a known way, the power supply of the starter is stopped after each power supply phase for a first, relatively short, predetermined period, called a "non-stress" period.

According to the invention, the starter power supply is disabled for a second predetermined period, longer than the first non-stress period, when the number of consecutive starter power supply phases exceeds a predetermined value, without the internal combustion engine reaching an autorotation state.

In other words, when the number of starter power supply then non-stress cycles become too great, the starter is forced into a calculated idle phase, preventing its stress for a longer duration.

The invention therefore consists of forcing a relatively long idle time, for lowering the temperature of the starter which has increased as a result of the linking together of starting cycles.

It is important to note that this protective measure takes place without it being necessary to perform any temperature measurement, so that effective protection is achieved without the addition of costly components that have to be installed in the starters or neighboring circuits that exist to date.

Protection is achieved by counting the number of operating cycles and measuring the duration of the idle time. This measurement can be performed via the intermediary of an onboard computer, thanks to software and/or hardware means programmed for this purpose.

In practice, the maximum number of power supply and non-stress cycles is determined according to the thermal parameters of the starter, which may be modeled following full-scale tests.

In addition, the method according to the invention may include a step consisting of estimating the internal temperature of the starter. This estimation is done by adding together the estimates of the positive variations in temperature corresponding to the power supply phases and the estimates of negative variations of this same temperature during the non-stress phases. When this temperature estimate exceeds a predetermined temperature threshold, the starter power supply can be disabled for a predetermined duration, enabling the internal temperature of the starter to be reduced. This predetermined duration can advantageously be of the same duration as the duration of disablement which is forced when the number of starter stress cycles becomes too high, as previously explained.

In other words, the thermal behavior of the starter is modeled by evaluating the rise in temperature liable to occur when the starter is powered. This temperature rise is reduced by the evaluation of the temperature fall that occurs during non-stress phases. In order to retain a safety margin in this estimate, the parameters taken into consideration are evaluated under the most unfavorable conditions. Thus, temperature rises are estimated by taking into account measurements recorded for operation at maximum torque and under a minimum ambient temperature, while the internal combustion engine is still cold and lubrication is not optimal. Conversely, the evaluation of temperature decrease is performed from actual measurements based on operation at maximum ambient temperature.

Furthermore, it is possible to combine the invention with aspects enabling protection against other risks of damage, and in particular risks of windings overheating, overspeed or failure to engage.

Thus, by limiting each power supply phase to a predetermined duration, of the order of about ten seconds, the starter windings are protected, by preventing their temperature from rising too high, should the power supply be prolonged.

Moreover, it is known that the starter is associated with an electrotechnical device called an "actuator", whose purpose is to ensure the engagement of the starter output pinion with the internal combustion engine's ring gear. This actuator mainly comprises two solenoids, acting as electromagnets for mechanically displacing the pinion in the direction of the ring gear. One of these solenoids, called the "series" solenoid is mounted in series with the starter. A current flows through it at the beginning of the starter power supply phase. Then, when the starter pinion engages the internal combustion engine's ring gear, a contact mechanically connected to the pinion shunts this "series" solenoid which is then no longer traversed by a current.

According to another characteristic of the invention, if during a power supply phase, it is found that the internal combustion engine remains at zero speed, the power supply to the starter can then be shut off automatically. In fact, generally it is considered that if the autorotation state is not reached after a given duration, typically of the order of about ten seconds, it is not necessary to continue with the driving, since non-starting is due to another cause. These causes chiefly include a failure of the starter pinion to engage with the engine ring gear. In this case, the non-engagement of the pinion means that the internal combustion engine is not driven, which, according to the invention, therefore causes the starter power supply control to be switched off. Thus the actuator "series" solenoid is prevented from being damaged by overheating due to prolonged power supply.

Furthermore, it is possible thanks to the invention to prevent any risks of the starter pinion engaging on the engine ring gear while the latter is not completely stabilized. It is, in fact, detrimental to the mechanical integrity of this pinion if the starter is re-engaged while the ring gear is not completely motionless. But the rotation speed of this ring gear, which corresponds to the engine speed, is estimated by means of a sensor whose accuracy is of the order of a few tens of revolutions per minute. It may therefore be that the speed of the ring gear is not strictly zero, while the value returned by the sensor may imply this.

According to another characteristic of the invention, a minimum time of the order of a few seconds is imposed before permitting another stress on the starter, after the engine speed has passed below the accuracy threshold of the sensor. Thus it is certain that after the expiration of this additional duration, the engine ring gear is actually motionless, and that a fresh engagement of the starter does not present any mechanical risk.

SUMMARY DESCRIPTION OF THE FIGURES

The manner of implementing the invention, as well as the advantages arising from it, will clearly emerge from the description of the mode of embodiment that follows, supported by the accompanying figures in which.

MANNER OF IMPLEMENTING THE INVENTION

Figure 1:
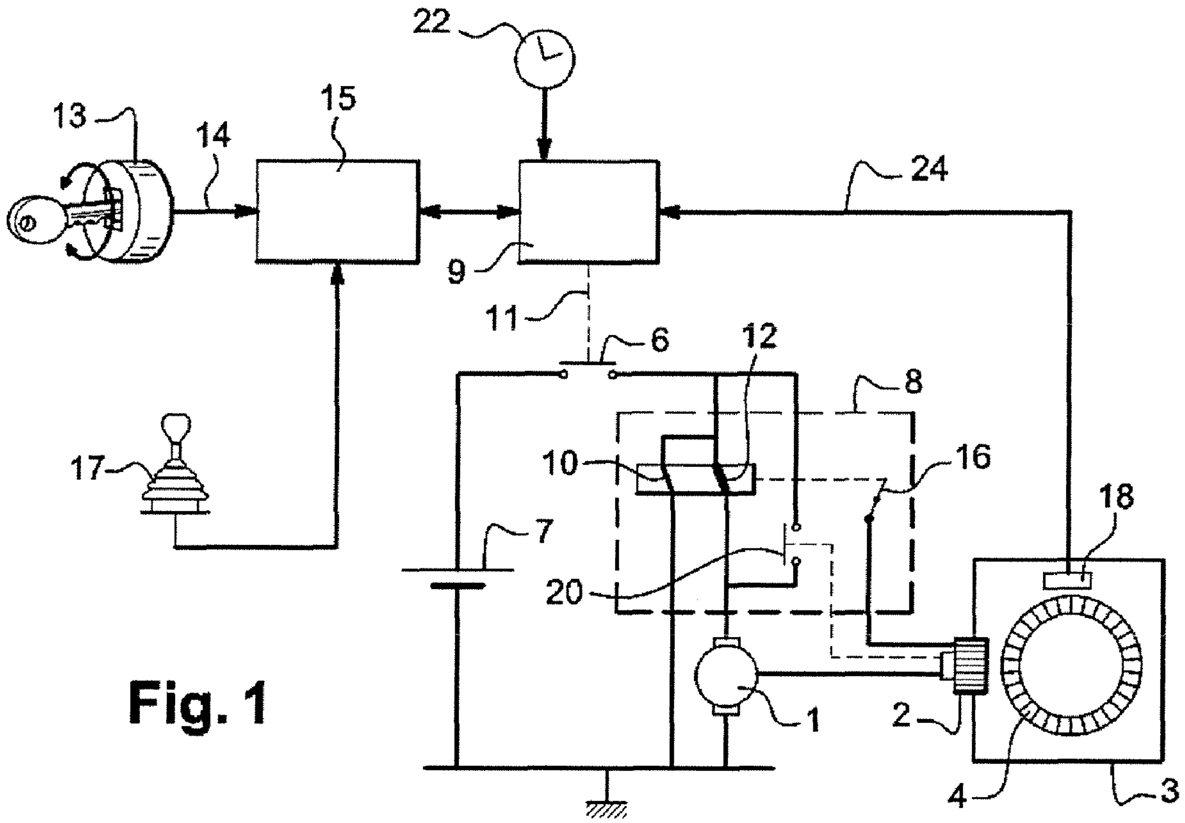
FIG. 1 is a simplified diagram illustrating the different elements participating in the control of a starter according to the invention.

As already mentioned and illustrated in FIG. 1, a starter 1 installed in a vehicle is an electric motor intended to engage via its pinion 2 an internal combustion engine 3, and more precisely on a truck, the ring gear 4 located at the output of the latter. Control of the starter 1 is effected by a relay whose contact 6 is used to supply power to the starter commutator via the intermediary of the electric battery 7 present in the vehicle.

Control of the contact 6 of this relay is achieved via an electrotechnical device 8 called an "actuator" comprising different solenoids intended for enabling the engagement of the starter pinion 2 in the ring gear 4 of the engine 3. More precisely, the actuator 8 comprises a first solenoid 10, called a "shunt" solenoid, mounted in parallel with the starter 1. A second solenoid, called a "series" solenoid 12 is mounted in series with the starter 1. The winding of the "series" solenoid 12 is made with a wire supporting a stronger current than that of the "shunt" solenoid 10. These two solenoids 10, 12 are connected to the battery as soon as the contact 6 is closed. First, the magnetic flux generated by the two "shunt" 10 and "series" 12 solenoids causes the displacement of a claw or fork mechanism 16, which generates the movement of the pinion 2 in the direction of the ring gear 4 of the internal combustion engine. The resistance of the "series" solenoid 12, added to the resistance of the starter 1 coil, means that the starter is driven at a slower speed. When the pinion 2 reaches a position where it engages the ring gear 4, a contact 20 is mechanically and automatically closed. This contact 20 is mounted in parallel with the "series" solenoid 12, so that the latter is short-circuited. The starter 1 is then directly connected to the battery 7, and its rotation speed therefore increases, so as to drive the internal combustion engine at a higher rate.

Other alternative electrotechnical architectures can be employed for producing the actuator, without going outside the scope of the invention.

In practice, the contact 6 actuating the starter is controlled by an onboard computer 9 generating appropriate commands 11. This computer 9 receives the signal that the driver wishes to start the vehicle, and therefore actuates starting device, which is illustrated schematically by the rotation of a contact key 13 in FIG. 1. The signal 14 of a desired stress on the starter may be routed, as illustrated in FIG. 1, via a second computer 15, but it could also be sent directly to the computer 9 responsible for the control of the contact 6 upstream from the actuator 8.

As a guide, the computer 15 can be interfaced with different components of the vehicle, for example the gearshift lever 17, so as to detect for example the position of said gearshift lever at the neutral point, in order to prevent other stresses on the starter when the gearshift lever 17 is not at the neutral point. Likewise, the computer 9 is interfaced with a speed sensor 18 giving a picture of engine rotation speed.

In accordance with the invention, the computer 9 provides control of the contact 6 so as to prevent any risk of the starter overheating. In order to do so, the computer 9 enables the power supply of the starter 1 via the actuator 8 when a command is given by the driver, via the intermediary of the contact key 13 or a similar device, such as a remote control device for example.

A clock device 22 supplies a signal relating to the passage of time to the computer 9 or to a computer to which the latter is connected. In general, the inventive method can be implemented by said computer 9, or multiple computers, using hardware components and/or software aspects, taken separately or in combination.

Moreover, control of the starter's power supply is disabled when the internal combustion engine 3 has reached its autorotation state, in order to avoid the risks of engaging the starter 1 at too fast a speed.

Figure 2:
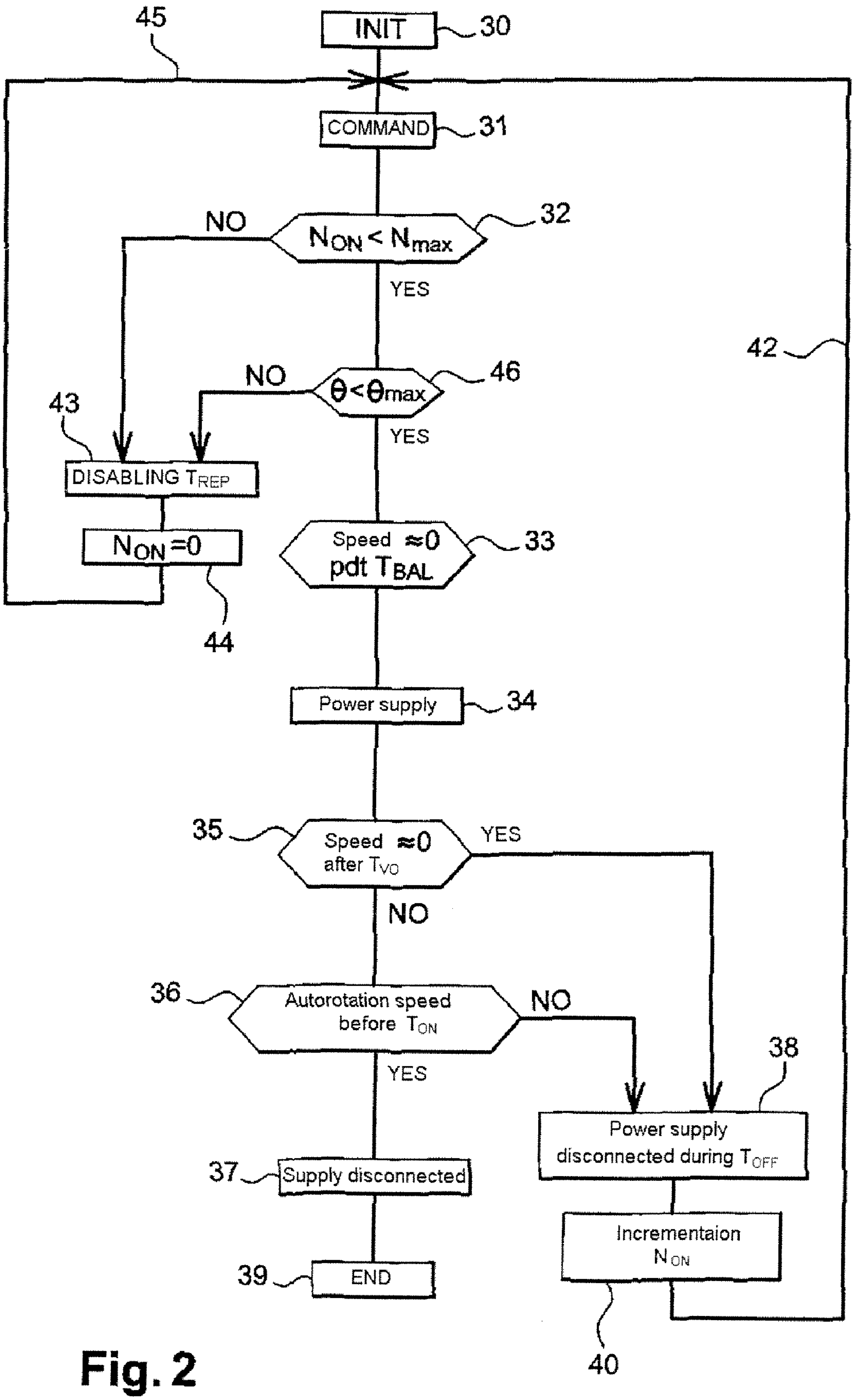
FIG. 2 is a flow diagram illustrating the sequence of the method in conformity with the invention.

The method according to the invention proceeds as illustrated in FIG. 2. Thus, when it is powered up, the computer 9 performs an initialization step 30, by which the counter for the number of consecutive starter power supply phases is set to zero. The computer 9 is at the stage of waiting 31 for a start-up command from the driver.

As soon as such a command is received, a test is performed in the course of a step 32 on the number $N_{ON}$ of consecutive power supply phases since the last powering up of the computer 9. If this number is less than a predetermined value $N_{max}$, then the method may continue with a view to enabling the power supply to the starter. The maximum number $N_{max}$ of consecutive starter power supply phases is determined by taking into account the thermal behavior of the starter, thanks to prior modeling.

More precisely, thermal modeling of different starters can be used to discover the rate of temperature rise of a starter, and the rate of decrease in temperature when it is not stressed. In order to retain a safety margin with regard to the risks of overheating, this modeling is done under the most unfavorable conditions. Thus, the estimate of temperature increase during the supply of power to the starter results from tests carried out at very low ambient temperature, while the internal combustion engine is still cold and lubrication is not optimal. This optimum heating is modeled assuming that the engine must provide the maximum torque, which occurs chiefly when the gearbox clutch is engaged.

The tests carried out on different types of starter lead to temperature rise coefficients of the order of 3 to 15° Celsius per second, and typically between 5 and 10° C./s.

In addition, the rate of decrease in temperature of the starter is estimated under the most unfavorable conditions, i.e. when the ambient temperature, and therefore that of the starter, is particularly high. The tests carried out indicate that under these conditions the rate of decrease in temperature is of the order of one to a few degrees Celsius per second.

Thus, the maximum number $N_{max}$ is determined so that the temperature increase after $N_{max}$ cycles, combining a power supply and a non-power supply phase, does not risk damaging the starter. It is, in fact, detrimental to the service life, or even the correct operation of the starter, when its temperature exceeds approximately 180° C. to 250° C., according to the type of starter, and especially the insulation classes of its windings. For each type of starter, the maximum number $N_{max}$ is therefore determined to avoid any exceeding of a critical temperature threshold. In practice, this maximum number is around 4 or 5.

The computer 9 is also used to ensure protection against other phenomena liable to cause damage to the starter, especially the engagement of the starter when the engine is not completely motionless.

Thus, an engine speed monitoring step 33 is performed before enabling the power supply of the starter. Thus, the speed sensor 18 is used to ensure that the engine 3 speed is brought down below a certain low threshold, of the order of a few tens of revolutions per minute, taking the accuracy of the sensor 18 into account. The transition below this speed threshold is not, however, synonymous with a complete stoppage of the engine, so that it is necessary to count an additional period $T_{BAL}$, of the order of a few seconds, at the conclusion of which it is deemed that the engine speed is effectively completely canceled out. This avoids the engagement of the starter on the engine in so-called "ring gear in balance" situations in which the engine is in slight, diminishing movement.

When the condition of zero engine speed is met, after the time delay 33, the computer can then enable the power supply of the starter, according to step 34.

A test 35 of the engine speed is then performed, in order to avoid the risks of overheating the actuator "series" solenoid 12. If the internal combustion engine 1 has remained at zero speed despite the power supply of the starter, after a duration $T_{V0}$, typically of the order of a second, the method passes into step 38, so that control of the starter is disabled via closure of the contact 6. It is considered that if the speed of the internal combustion engine has not quickly exceeded the accuracy threshold of the speed sensor 18, it is pointless to continue with the power supply of the starter, since a failure of the pinion 2 to engage in the ring gear 4 may then be assumed. In other words, the duration of the power supply phases is limited to a predetermined duration $T_{V0}$, if the speed of the internal combustion engine remains zero during a starter power supply phase.

On the other hand, if the engine speed increases, the method passes on to step 36, during which, thanks to the signal 24 originating from the speed sensor 18, computer 9 monitors whether the engine speed has reached the autorotation state. If this test 36 shows that the engine speed is sufficient, the method passes on to the next step 37, during which the power supply of the starter is interrupted so as to cause its disengagement from the ring gear 4. The inventive method ends at step 39, since the starter has fulfilled its function of starting the internal combustion engine.

Conversely, if the test 36 is negative, i.e. if the engine speed does not reach the autorotation state after a duration $T_{ON}$ of the order of about ten seconds, step 38 is initiated, so that the starter power supply is interrupted for a duration $T_{OFF}$ so as to avoid overheating of the starter windings. Thus, after a power supply phase, the computer 9 prevents any stress on the starter, even if a control command is issued by the driver. The duration $T_{OFF}$ of non-stress is determined by estimating the decrease in temperature that takes place during this non-stress phase.

As soon as the power supply has been interrupted following a failure of the internal combustion engine to start up, a counter is incremented, at step 40, for the number $N_{ON}$ of power supply phases. The system then returns, via the transition 42, into a state of waiting for a command from the driver, according to step 31.

If the number of consecutive unsuccessful phases $N_{ON}$ reaches the critical value $N_{max}$, then the test 32 causes the transition into a step 43 of disablement for a relatively long period, of a duration $T_{REP}$, to ensure a sufficient decrease in the temperature of the starter. When this period of disablement is concluded, the counter for the number $N_{ON}$ of consecutive power supply phases is reset, via step 44, and the system then returns, via the transition 45, into a state of waiting for a command from the driver according to step 31.

As illustrated in FIG. 2, the method may also comprise a test 46 on the estimated temperature θ of the starter. This test 46 can be optional, in so far as limiting the number of consecutive power supply phases can be used to avoid an excessive increase in the temperature of the starter. However, an additional temperature check can be used to reinforce the protection of the starter. Assuming that the computer 9 is no longer powered, for example in the case of a disconnection by the driver, the consecutive power supply phase counter is reset. In this case, an estimate of the change in temperature of the starter can provide additional protection.

Thus, the temperature of the starter can be estimated by adding up the estimated temperature variations corresponding to the power supply phases and by subtracting the estimated variations for the non-power supply phases. These temperature variations can be estimated using the temperature rise coefficients mentioned above, of a few degrees Celsius per second. In the case of a disconnection leading to the computer 9 shutting down, the temperature estimate is calculated by taking into account the elapsed duration after the disconnection.

Thus the temperature test 46 is used to verify whether the estimated temperature of the starter exceeds a predetermined threshold $\theta_{max}$. This threshold is determined according to the temperature that is not desired to be attained by the starter. If the temperature of the starter exceeds this threshold $\theta_{max}$, step 43 follows causing the disablement of the starter power supply for an idle period of a duration $T_{REP}$. On the other hand, if the estimated temperature remains below the threshold $\theta_{max}$, then the method continues normally to enabling 34 the power supply of the starter.

Figure 3:
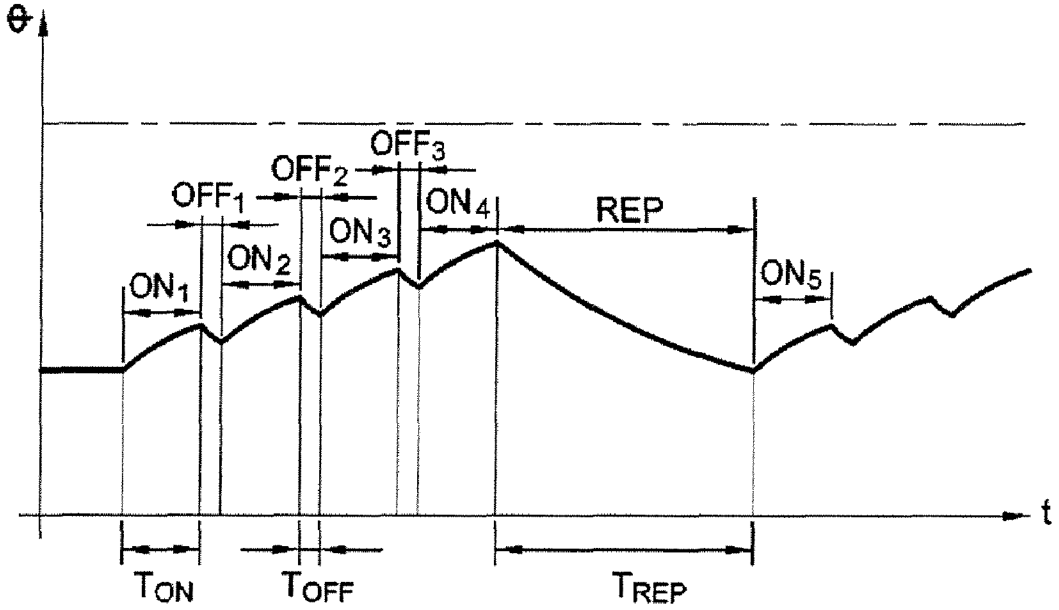
FIG. 3 is a simplified timing diagram illustrating the progress of estimating the temperature of the starter, as a function of time.

The change in the estimated temperature θ is illustrated in FIG. 3. Thus, during a power supply phase $ON_1$, $ON_2$, $ON_3$, $ON_4$, the starter temperature increases, and it decreases during the non-stress phases $OFF_1$, $OFF_2$, $OFF_3$. According to the invention, the computer 9 counts the number of power supply and non-stress cycles in order to estimate the temperature liable to prevail within the starter. Beyond four cycles, as given by way of example in FIG. 3, said calculator enforces a longer non-stress period $T_{REP}$, to enable a substantial lowering of the temperature inside the starter. This long non-stress period, or idle period, has a duration $T_{REP}$ longer than a few tens of seconds, and typically longer than 2 minutes, enabling the starter temperature to be reduced substantially. At the expiration of this period, the starter can again be stressed by supplying power to it for a phase $ON_5$, and so on.

The method therefore ensures a limitation of the temperature within the starter, without having recourse to an actual measurement of this temperature, but solely thanks to a count of the number of power supply cycles, combined with thermodynamic modeling of the starter.

It emerges from the foregoing that the method according to the invention has multiple advantages, in particular that of preventing the risks of the starter or the associated actuator overheating as a result of too great a stress. This protection is obtained without it being necessary to equip the starter with temperature sensors in particular, or with temperature-sensitive protective devices such as thermal trip switches. On the contrary, said protection uses the computer resources already present on the vehicle, without giving rise therefore to any additional material cost.

Moreover, the control of temperature rise in the starter can be used for designing its components using materials whose temperature resistance is not overrated.

The invention claimed is:

1. A method of controlling the power supply of an electric starter (1) that drives the internal combustion engine (3) of a vehicle, which electric starter comprises an actuator to ensure the engagement of a starter output pinion with a ring gear of the internal combustion engine, wherein the starter (1) power supply is stopped after each power supply phase for a first predetermined period ($T_{OFF}$);

the duration of each of the starter power supply phases is limited to a predetermined duration ($T_{V0}$), on the order of a second, if the speed of the internal combustion engine remains zero during the starter power supply phase;

the starter power supply phases have a maximum duration ($T_{ON}$) on the order of about ten seconds; and wherein if the duration of a power supply phase has been limited because the speed of the internal combustion engine has remained zero during a starter power supply phase, the starter power supply is stopped for a predetermined duration ($T_{OFF}$); a counter is incremented for the number ($N_{ON}$) of power supply phases; and, after incrementing the counter, the system returns (42) into a waiting state.

2. The method of claim 1, wherein the starter (1) power supply is disabled for a second predetermined period ($T_{REP}$) longer than said first period ($T_{OFF}$) when the number ($N_{ON}$) of consecutive starter power supply phases ($ON_1$, $ON_2$, $ON_3$, $ON_4$) exceeds a predetermined value ($N_{max}$) without the internal combustion engine (3) reaching an autorotation state.

3. The method of claim 2, wherein the internal temperature of the starter (1) is estimated by adding together estimates of positive variations of said temperature corresponding to power supply phases ($ON_1$, $ON_2$, $ON_3$, $ON_4$) and estimates of negative variations of said temperature during non-power supply phases ($OFF_1$, $OFF_2$, $OFF_3$) and the starter power supply is disabled for a third predetermined period if the estimated temperature exceeds a predetermined temperature threshold ($\theta_{max}$).

4. The method of claim 3, wherein the second and third predetermined periods are of the same duration ($T_{REP}$).

5. The method of claim 1, wherein the starter power supply (1) is stopped for a predetermined period ($T_{BAL}$) which begins when the measurement of the engine (3) speed goes below a predetermined low threshold.

* * * * *